United States Patent [19]

Piotrowski

[11] Patent Number: 5,181,898
[45] Date of Patent: Jan. 26, 1993

[54] COVER ASSEMBLY FOR MULTI-CONFIGURABLE MACHINE TOOL

[75] Inventor: Tadeusz W. Piotrowski, Cincinnati, Ohio

[73] Assignee: Cincinnati Milacron, Inc., Cincinnati, Ohio

[21] Appl. No.: 760,864

[22] Filed: Sep. 16, 1991

[51] Int. Cl.$^5$ .................... B23Q 3/157; B23Q 7/02
[52] U.S. Cl. .................. 483/3; 29/DIG. 56; 29/DIG. 59; 409/134; 414/223; 483/14; 483/56
[58] Field of Search ....... 26/568, 33 P, 563, DIG. 56, 26/DIG. 59, DIG. 60; 409/134; 51/268; 74/609, 608, 614; 312/203, 198, 202, 326; 414/223, 222, 217; 198/346.1; 483/3, 14, 56

[56] References Cited

U.S. PATENT DOCUMENTS

| | | | |
|---|---|---|---|
| 2,766,561 | 10/1966 | Carlson | 51/268 X |
| 3,355,799 | 12/1967 | Daugherty | 29/568 |
| 3,366,012 | 1/1968 | Richter | 409/134 |
| 3,930,302 | 1/1976 | Ochiai et al. | 29/568 |
| 4,576,537 | 3/1986 | Inaba et al. | 414/222 |
| 4,673,076 | 6/1987 | Mattson | 198/346.2 |
| 4,677,718 | 7/1987 | Babel | 29/33 P |
| 4,677,733 | 7/1987 | Andersson | 29/563 |
| 4,742,609 | 5/1988 | Neuman | 29/568 |
| 4,768,902 | 9/1988 | Rütschle et al. | 29/DIG. 56 X |
| 4,795,300 | 1/1989 | Tomaselli et al. | 414/223 X |
| 4,797,989 | 1/1989 | Cherko | 29/568 |
| 4,809,422 | 3/1989 | Kitamura | 29/568 |
| 4,863,319 | 9/1989 | Winkler et al. | 409/134 |
| 4,863,320 | 9/1989 | Rütschle et al. | 74/614 X |
| 4,886,592 | 12/1989 | Anderle et al. | 414/223 X |
| 4,966,505 | 10/1990 | Winkler et al. | 74/608 X |
| 4,999,895 | 3/1991 | Hirose et al. | 29/33 P |

FOREIGN PATENT DOCUMENTS

| | | | |
|---|---|---|---|
| 3834208 | 4/1989 | Fed. Rep. of Germany | 198/346.1 |
| 2-24943 | 9/1990 | Japan | 414/222 |
| 60946 | 3/1991 | Japan | 414/223 |
| 810382 | 3/1981 | U.S.S.R. | 409/134 |
| 1071396 | 2/1984 | U.S.S.R. | 409/134 |

Primary Examiner—William Briggs
Attorney, Agent, or Firm—Frost & Jacobs

[57] ABSTRACT

A cover assembly for a machine tool having a base supporting a workhead and a second machine part such as a spindle housing, headstock or tool turret, and wherein a rotatable workpiece changing mechanism is provided in conjunction with the workhead. The cover assembly includes an external housing member which encloses the workhead and the second machine part and permits movement of the second machine part therewithin. The external housing member further includes a workpiece exchange opening and a workpiece exchange shield which is reciprocable between a first position which effectively closes the opening, and a second position which allows unencumbered rotation of the workpiece changing mechanism. The shield is reciprocable in parallel with the workpiece changing mechanism to obviate added machine idle time. An internal housing substantially encloses the second machine part within the external housing, and is mounted for movement with the second machine part. The cover assembly accommodates varying machine tool configurations with only minimal changes of relatively modular parts.

20 Claims, 10 Drawing Sheets

COVER ASSEMBLY FOR MULTI-CONFIGURABLE MACHINE TOOL

TECHNICAL FIELD

This invention relates generally to covers and shielding devices for machine tools for confining coolant, cutting chips, and machining debris, and, more particularly, to an improved cover assembly adapted for use with a machine tool which can be configured in one of a plurality of machining arrangements, wherein the cover assembly includes an external housing substantially enclosing the machine tool and accommodating a rotatable workpiece changing mechanism, and an internal housing substantially enclosing the second machine tool part and mounted within the external housing for movement with the second machine part.

BACKGROUND OF THE INVENTION

It is a common for machine tools of various types to include a cover member disposed over at least the machining portions of the tool to confine coolant and workpiece shavings, cutting chips and the like. In conventional arrangements, the cover unit is disposed over the machine tool and is provided with one or more openings for facilitating maintenance of the machine tool and interchange of workpieces and tools used therein.

An example of an enclosure for a machine tool having an automatic tool changer is shown in U.S. Pat. No. 3,355,799, which issued to J. Daugherty. Particularly, the Daugherty enclosure was contemplated as a unitized and free standing cabinet which completely enclosed the storage matrix, linear transfer mechanism and rotary arm in order to protect these parts from ambient dust and dirt. The Daugherty enclosure includes a matrix cabinet and a linear transfer mechanism housing, wherein the matrix cabinet has an L-shaped door providing a corner access opening for loading selected tools. The housing also includes a closure member covering its front portions adapted to be automatically opened and closed in timed relation with the tool change cycle, thereby permitting exchange of a tool from the tool changer enclosure. A hydraulic cylinder moves the door along a track in order to open the housing to provide clearance for the tool transfer arm during tool change procedures. All of the openings are provided with seals to enable pressurization of the enclosure to prevent dust and other debris from entering into and accumulating upon the tool changing apparatus.

Another machine tool with a guard/cover apparatus is shown in U.S. Pat. No. 3,930,302, which issued to Y. Ochiai, et al. The Ochiai, et al. machine tool is contemplated as including an automatic tool changer with radially arranged tools provided above the spindle. A pair of guard covers are situated between the spindle head and tool storage magazine, and a hydraulic actuator is provided to open the guard covers to permit tool exchange, and to close the covers for machining operations. A separate guard cover is fixed on a column over the entire circumference of the tool magazine, except at the tool change position where the pivotal guard covers are arranged.

Another cover unit for a machine tool is shown in U.S. Pat. No. 4,999,895, which issued to A. Hirose, et al. The Hirose, et al. cover unit is provided for a multi-work station machine tool and includes a pair of doors each adapted to close half of an opening formed in the front panel of the cover unit. The doors are connected to hydraulic cylinders and are alternately opened to enable exchange of workpiece pallets on a stationary machining table. This arrangement is aimed at enabling exchange of a workpiece at a second position while machining is taking place at a first position. The individual doors enable better confinement of cutting chips and coolant by minimizing the area of the cover which must be opened to the exterior during actual machining procedures. Larger doors are also provided adjacent the smaller doors to enable maintenance access to the machine tool.

Clearly, a number of machine tool cover arrangements have been available in the industry, in modern machine tool applications, however, relatively free interchange of tools and workpieces must often be accommodated, and machining centers are preferably reconfigurable between milling, turning, and other machining operations. While the enclosure must effectively isolate the machining area from the external environment and from the other structural parts of the machine, it must also provide access for maintenance and repair of the machine tool. Moreover, the cover structure must preferably be able to accommodate various configurations of the machine tool with minimal substantive changes to the cover structure itself.

Heretofore, there has not been available a machine tool covering assembly or structure which provided complete shielding of every structural part of the machine from the working environment, as well as effective isolation of the working environment from the external environment, while easily accommodating the interchange of workpiece members and tools. In applications where covering doors or openings were provided, the machine had to be idle (i.e., in a non-machining mode) while such doors were opened and/or closed. Additionally, with the increasing use and need for reconfigurable machine tools, a cover assembly which can efficiently accommodate a variety of different machine tool application configurations with minimal structural changes in the cover assembly itself, and which permits relatively convenient access to the machine tool for maintenance, tool exchange, and workpiece exchange is needed in the industry.

DISCLOSURE OF THE INVENTION

It is an object of this invention to provide a cover assembly for machine tools which overcomes the problems and shortcomings of cover devices and structures previously available.

It is another object of the present invention to provide a machine tool covering assembly which effectively shields all of the structural parts of the machine from the machining or working area, while effectively isolating the machining area from the external environment.

It is also an object of the invention to provide a machine tool covering assembly which isolates the working components of the machine tool from the working area, and allows for interchange of tooling and/or workpieces without interference with the machine operation cycles and without adding to machine idle time.

It is yet another object of the present invention to provide a machine tool cover assembly which can efficiently accommodate a machine tool which can be configured in a variety of ways with minimal structural changes required in the cover assembly itself.

It is another object of the present invention to provide a machine tool cover assembly which permits convenient access to the machine tool for workpiece and/or tool exchange, maintenance and repair.

It is yet another object of the present invention to provide a machine tool cover assembly which can accommodate a variety of machine tool configurations, which maximizes containment of machine debris, which maximizes both Physical and visual access to the machine tool and its individual parts, and which is relatively simple in design and operation.

It is another object of the present invention to provide a machine tool cover assembly which easily accommodates vertical loading and exchange of workpieces, horizontal machining operations, and improved access to the machine tool for workpiece and tool exchange, as well as for major maintenance work.

In accordance with one aspect of the present invention, there is provided a cover assembly for a machine tool having a workhead and a rotatable workpiece changing mechanism with a pair of spaced apart workpiece transfer stations for alternately moving workpieces between the workhead and a workpiece loading/unloading zone. The cover assembly includes a housing substantially enclosing the machine tool and having a workpiece exchange opening and a reciprocable workpiece exchange shield attached to the housing adjacent the opening. The workpiece exchange opening provides sufficient clearance for rotation of the workpiece changing mechanism, and the shield includes means for sealingly engaging the workpiece changing mechanism to substantially close the opening when in sealing position. The shield is reciprocable away from the changing mechanism to a second exchange position which accommodates the rotation of the changing mechanism without interference. In a preferred embodiment, the cover assembly further includes an internal housing which substantially encloses a second machine tool part which is supported on the base for movement relative to a workpiece supported on the workhead. The internal housing is mounted within the external housing and at least a portion of the internal housing is movable with the second machine part.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
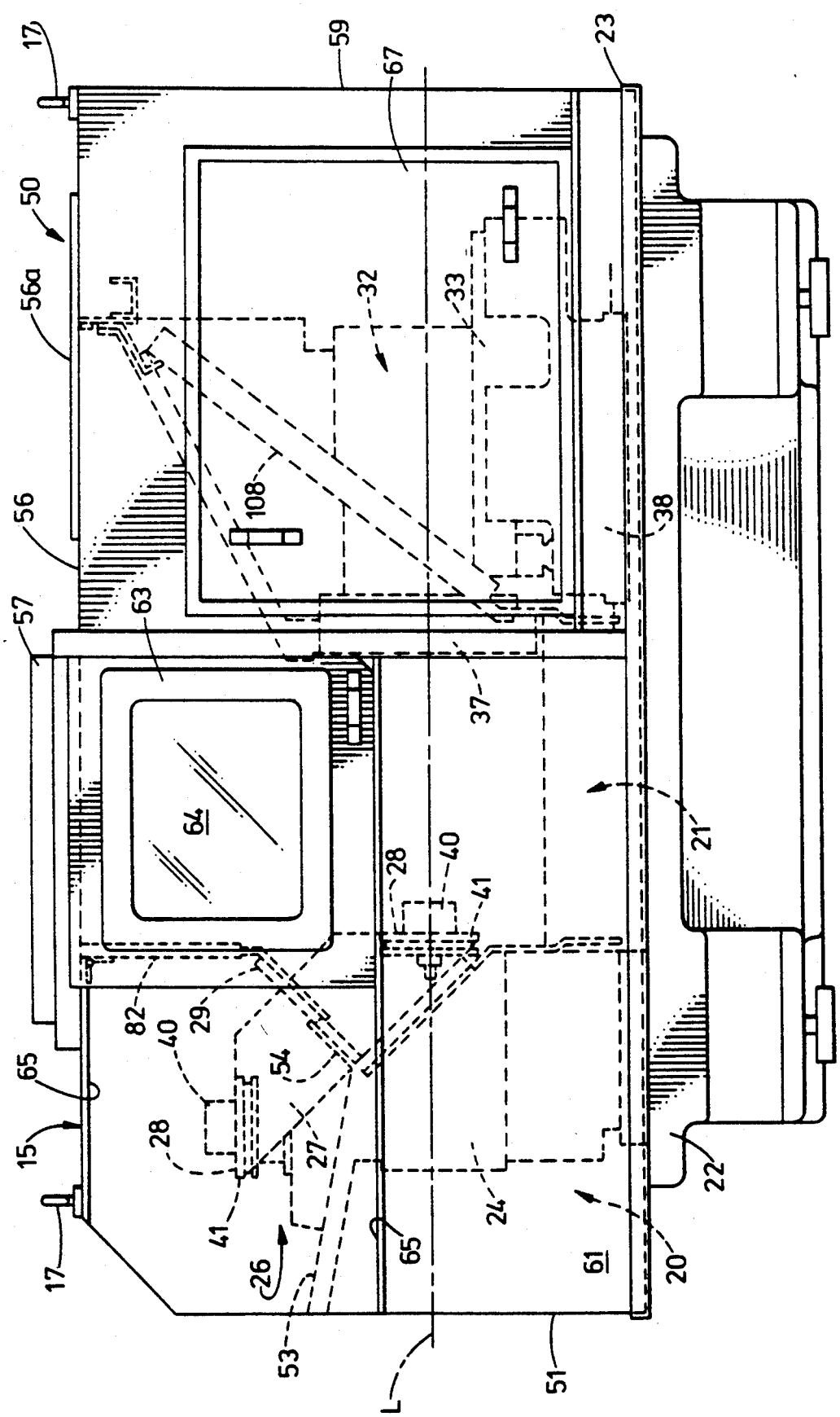
FIG. 1 is a right side elevational view of a cover assembly made in accordance with the present invention.

Referring now to the drawings in detail, wherein like numerals indicate the same elements throughout the views, FIG. 1 illustrates a right side elevational view of a cover assembly 15 made in accordance with the present invention and an associated machine tool 20. Machine tool 20 is shown as including a base 22, a workhead 24 having a rotatable workpiece changing mechanism 26 associated therewith, and a second machine tool part 32 including a spindle 37 mounted on a transversely movable table 33 and a longitudinal movable saddle 38.

Figure 2:
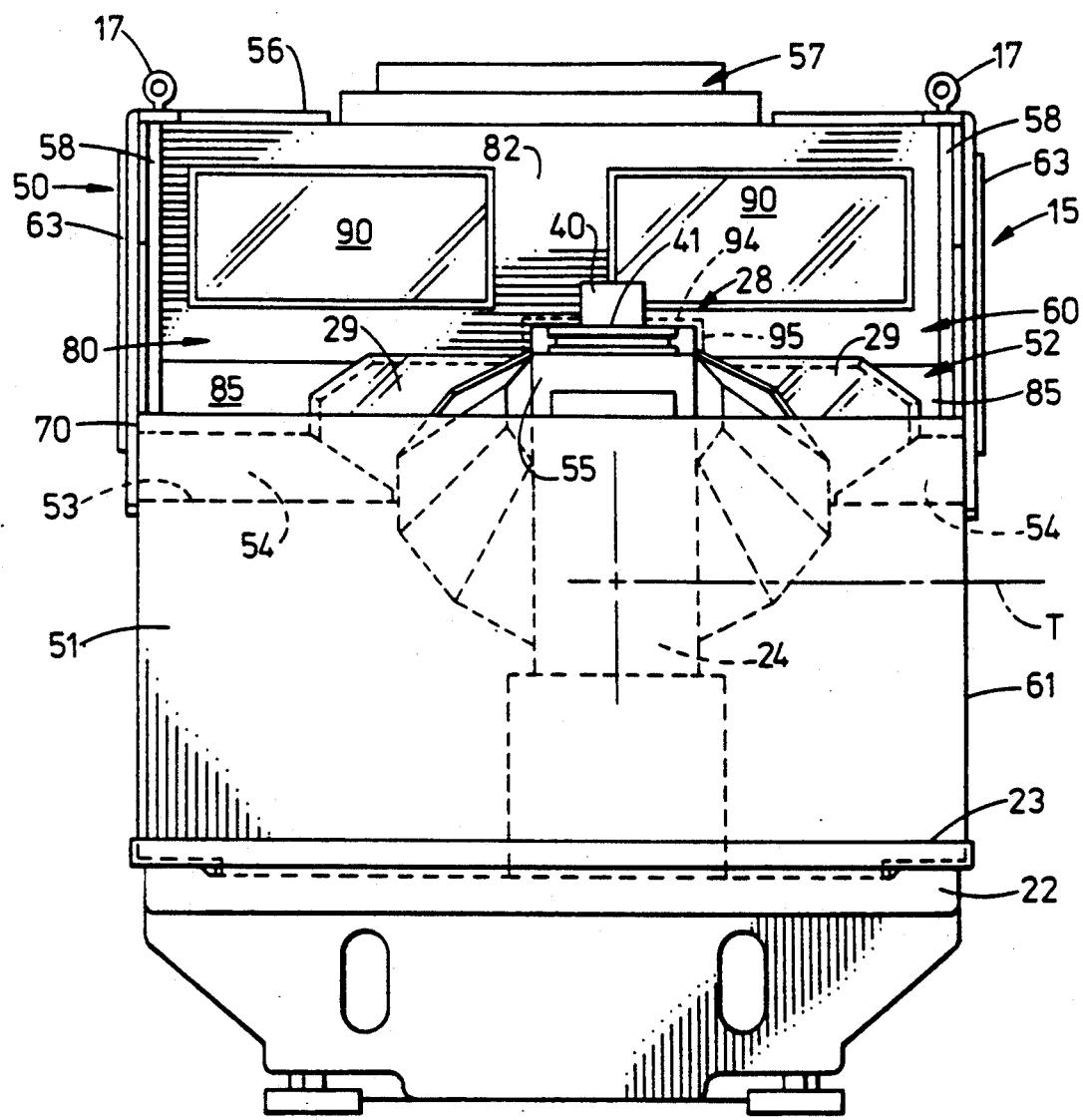
FIG. 2 is a front elevational view of the cover assembly of FIG. 1.

Cover assembly 15 substantially encloses machine tool 20, and comprises an external housing 50 defined by a front wall 51, rear wall 59, top wall 56, right side wall 61 and left side wall 70 (best seen in FIG. 2). As will be understood, the machining or working area 21 of machine tool 20 (i.e., the area where second machine tool part 32 approaches workhead 24 to accomplish milling, turning, etc.) will be fully enclosed within external housing 50. A machining access portal 63 is provided on right side wall 61 with a sliding door preferably including a window 64 to facilitate visual access. Slide rails 65 are provided to enable and guide the sliding door as it moves between open and closed positions.

A machine part access panel 67 is also provided as a removable portion of side wall 61, and situated to provide access to second machine part 32. Additional access panels may also be provided adjacent other key parts of the covered machine tool 20, as desired. It is also contemplated that similar access portals and removable panels will be provided on left side wall 70.

Figure 3:
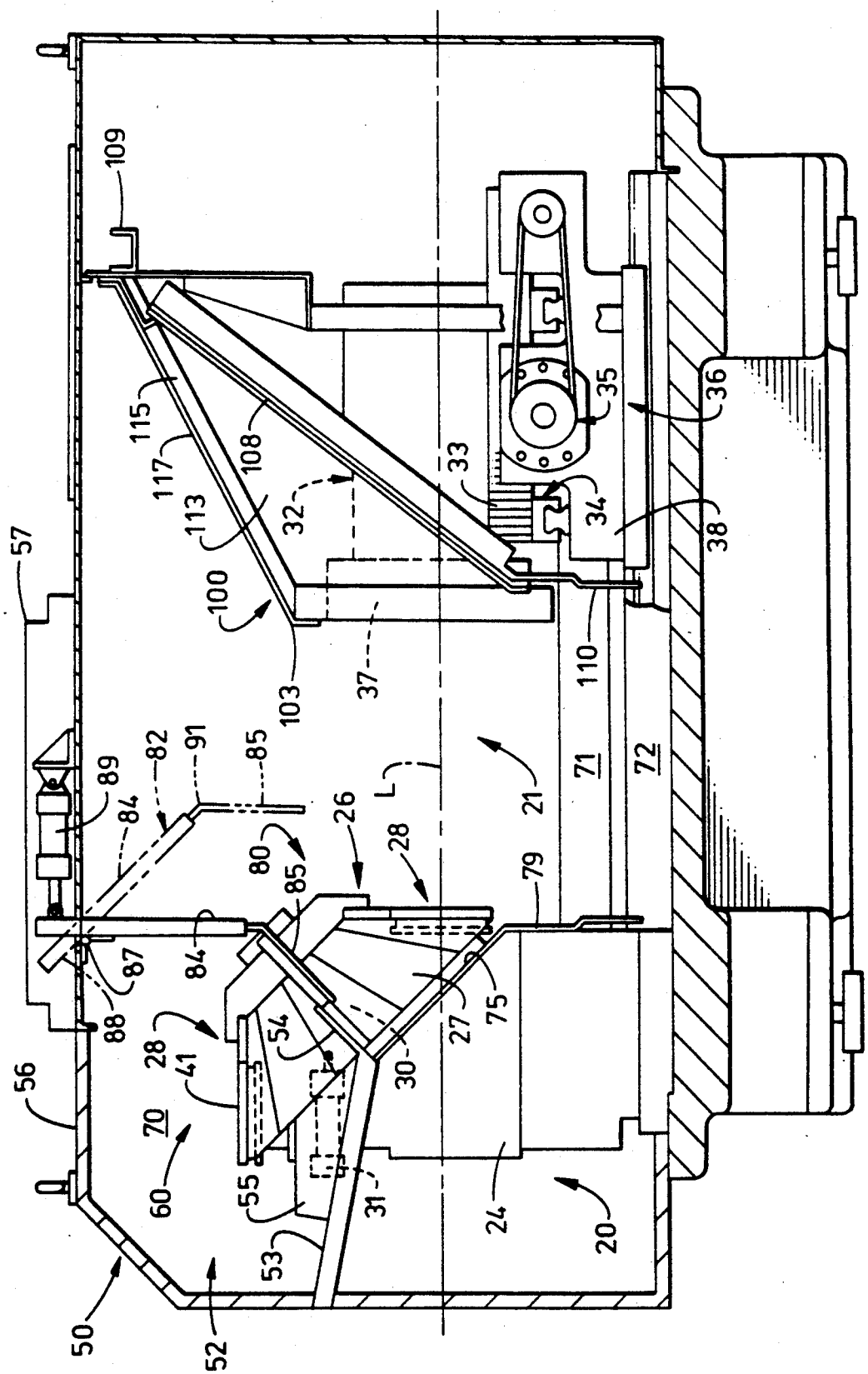
FIG. 3 is a partial, vertical cross-sectional view of the cover assembly of FIG. 1, illustrating portions of a machine tool on which the assembly has been mounted.

As seen best in FIGS. 2 and 3, external housing 50 further preferably comprises a front wall recess 52 defined by a slightly inwardly inclined and generally horizontal recess cover 53 and its upwardly angled recess flanges 54. As will be explained, front wall recess 52, in conjunction with workpiece exchange shield 82, provides a workpiece load/unload zone or area 60 for accommodating vertical or horizontal feeding of workpieces 40 (with or without workpiece carrying pallets 41) to machine tool 20. Right and left side walls 61 and 70, respectively, are preferably extended toward front wall 51 to partially enclose recess 52 and to provide an effectively isolated loading and unloading area 60 for workpieces (e.g., 40).

As shown in FIGS. 1-4, machine tool 20 includes a workhead 24 having a rotatable workpiece changing mechanism 26 preferably including a downwardly depending conical skirt 27 having at least a pair of oppositely disposed spaced apart workpiece transfer stations 28 adjacent the bottom edge of skirt 27. As will be appreciated, rotation of mechanism 26 enables alternate transfer stations 28 to be successively aligned with workhead 24 and loading/unloading zone 60. In this way, workpieces 40 can be provided to a transfer station 28 at load/unload area 60 (either automatically or manually) for rotational movement into alignment with workhead 24 for machining. With a pair of spaced apart workpiece transfer stations 28, while one workpiece 40 is being machined in working area 21, a previously machined workpiece can be removed from the oppositely disposed transfer station aligned at the load/unload area, and a new workpiece to be machined can be exchanged therefor. Angular orientation of workpiece changing mechanism 26 further enables loading and unloading to be accomplished at a different height (and possibly a more preferred height either for automatic or manual exchange) than the machining operations, which preferably take place at lower level.

Workpiece changing mechanism 26 further includes a splash panel 29 extending outwardly from opposite side of skirt 27 between a pair of oppositely disposed transfer stations 28. In a preferred arrangement, splash panel 29 can be provided of a transparent material to provide visual access from the load/unload area 60 into machining area 21 inside external cover 50.

As seen best in FIG. 3, a rotation apparatus 30 is provided for rotating changing mechanism 26 to alternately align the oppositely disposed transfer stations 28 between load/unload area 60 and workhead 24. Additionally, a longitudinal cylinder 31 is preferably provided for reciprocating rotation apparatus 30 and workpiece changing mechanism 26 inwardly in a direction substantially parallel to longitudinal axis L of machine tool 20, in order to disengage a workpiece 40 aligned with workhead 24 prior to rotation of changing mechanism 26. Rotation of changing mechanism 26 moves a machined workpiece to the unload area 60 for unloading procedures, while a new workpiece 40 is rotated into alignment with workhead 24. Thereafter, longitudinal cylinder 31 is activated to return changing mechanism 26 to its original position and to seat the newly aligned workpiece 40 with workhead 24 for machining operations.

In order to accommodate the longitudinal reciprocation and rotational movement of workpiece changing mechanism 26, external housing 50 is further provided with a workpiece exchange opening 80 which provides clearance for rotation of changing mechanism 26 without interference. A reciprocable workpiece exchange shield 82 is attached to external housing 50 adjacent opening 80 and designed to sealingly engage with changing mechanism 26 to effectively close and seal opening 80 and isolate the machining area 21 from the external environment. Exchange shield 82 is preferably hingedly connected across its upper edge via a flapper-type hinge 87 sealingly connected along the inner surface of top wall 56 of external housing 50, as seen best in FIG. 4.

Figure 4:
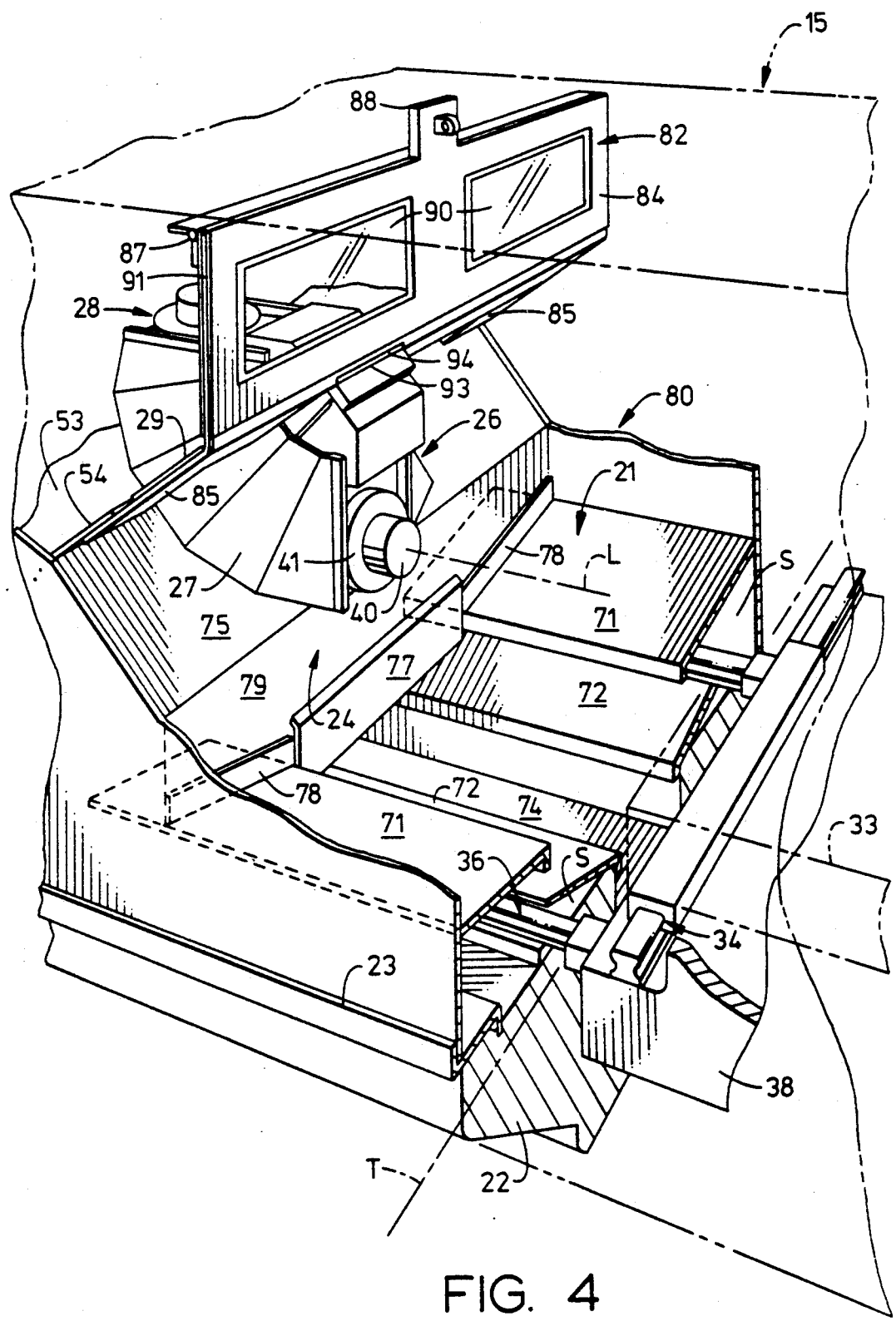
FIG. 4 is a partial perspective view of the front portion of the cover assembly and machine tool illustrated in FIG. 3.

Workpiece exchange shield 82 preferably comprises an upper shield panel 84 designed to depend substantially vertically downwardly from top wall 56 from hinge 87 when in closed position, as illustrated in FIG. 4. The opposite side edges of shield panel 84 can be fitted with side seals or wipes 91 which sealingly interface with the inner surfaces of side walls 61 and 70, respectively, as exchange shield 82, is articulated between open and closed positions.

As seen best in FIG. 3, a reciprocation lever extension 88 is preferably attached adjacent the upper portions of shield panel 84 and connected to a hydraulic cylinder or other means for providing a longitudinal stroke to lever extension 88. Reciprocation cylinder 89 is illustrated as a hydraulic cylinder located within a linkage cover 57 situated on top wall 56 for enclosing the cylinder/lever extension assembly. Cylinder 89 longitudinally reciprocates lever extension 88 toward the front of machine tool 20, thereby causing lever extension 88 to pivot around hinge 87 thereby articulating workpiece exchange shield 82 in an upward and rearward direction as depicted in FIG. 3.

Activation of cylinder 89 can be timed to be substantially simultaneous with or to slightly precede and correspond with the longitudinal and rotary motion of workpiece changing mechanism 26, as described above. In this way, workpiece exchange shield 82 can be selectively articulated between a first closed or sealing position and a second open or exchange position which accommodates the workpiece changing procedures without interference. It should also be understood that the shielding structure of the present invention is uniquely designed to operate in close parallel relationship with tool and workpiece exchange movements so that the shielding never compromises the most efficient operation of the machine tool. As a result of this parallel design, elements of the present cover assembly accommodate all movements of the respective machine tool operations without interfering therewith, and without adding to non-machining or idle time.

Depending from the lower edge of upper exchange shield panel 84 is a lower exchange shield panel 85, preferably oriented at a predetermined angle with respect to upper panel 84 in order to correspond with and overlap a portion of splash panel 29 and workpiece changing mechanism 26 when in sealing position (as best seen in FIGS. 3 and 4). Lower shield panel 85 and the lower portions of upper shield panel 84 further comprise a substantially centrally located cut-out 93 designed to accommodate and sealingly interface with skirt 27 and splash panel 29 when in sealing position. Portions of shield panels 84 and 85 can also be provided with windows (e.g., windows 90) and/or can be formed of relatively transparent materials to enhance visual access from the load/unload area 60 into machining area 21 of cover assembly 15.

As mentioned, the lateral side edges of exchange shield 82 can preferably be provided with side sealing devices or wipers 91 to maintain a sealed relationship between exchange shield 82 and the inner surfaces of cover assembly side walls 61 and 70, respectively. Because machining operations are suspended during workpiece exchange procedures, other sealing arrangements between exchange shield 82 and the inner surfaces of external housing 50 might also be utilized. For example, permanently mounted sealing plates or ribs (e.g., sealing ribs 58 have been included in FIG. 2 simply as an example of such alternate structure) might be situated along the inner surfaces of external housing 50 to sealingly mate with the lateral edges of exchange shield 82 when in sealed position.

As best seen in FIG. 4, it is also preferred that sealing material or structures (e.g., seals 94 and 95) be provided about the inner edges of cut-out 93 to insure that workpiece exchange shield 82 closely conforms with workpiece changing mechanism 26 when in sealing position to effectively close exchange opening 80 during machining operations. Compressible seals can similarly be provided about the lower periphery of panel 85 (e.g., seals 96 shown in phantom in FIG. 2) enhance the sealing engagement between adjacent parts in sealing position.

FIG. 4 further illustrates a stationary apron portion 75 extending downwardly and inwardly below skirt 27 from recess flanges 54 toward debris collection rough 74, as well as lower face 79, forward wall cover 77 and seals 78. These structures are preferably connected along their outer edges to external housing 50, and with skirt 27, effectively isolate the working components and structure of workhead 24 from the hostile environment of working are 21.

Figure 5:
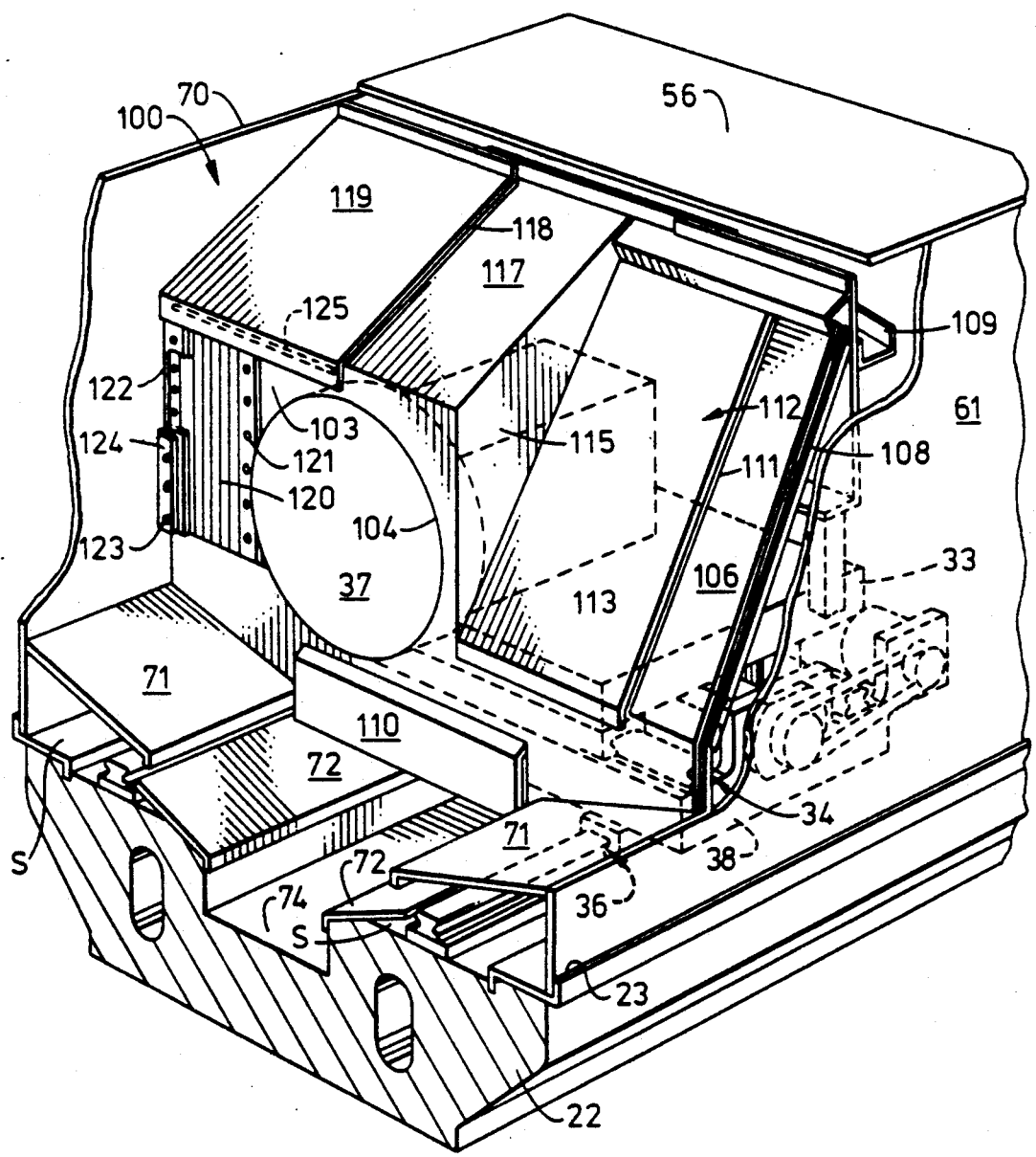
FIG. 5 is a partial perspective view of the rear portions of the cover assembly and machine tool of FIG. 3, illustrating the internal housing structure and including a partially broken out section to show particular details.

Machine tool 20 comprises base 22 having a longitudinal axis L and a transverse axis T, and further supports a second machine tool part 32 for movement relative to those longitudinal and transverse axes in order to position grinding wheels, tools, or the like relative to a workpiece (e.g., 40) supported on workhead 24. FIGS. 3 and 5 illustrate an internal housing 100 of cover assembly 15 especially adapted for a turning center configuration of machine tool 20. In such a turning set up, second machine tool part 32 preferably comprises a spindle 37 mounted on a table 33 provided with a transverse guide/guideway arrangement 34 to enable lateral movement of table 33 in a direction substantially parallel to transverse axis T. A conventional ballscrew arrangement 35 is contemplated for providing such lateral movement of table 33, and table 33 surmounts a saddle 38 which itself is arranged upon a conventional longitudinal guide/guideway arrangement 36 to provide longitudinal movement along axis L in a similar fashion.

As seen best in FIG. 5, internal housing 100 is depicted as including a turret hood 103 having an opening 104 which accommodates and substantially conforms to spindle 37. In addition to the front face and opening 104, turret hood 103 further comprises a central top piece 117 angled upwardly and rearwardly toward the inner surface of top wall 56 of external housing 50. Side top plate 119 is fixedly attached to saddle 38 for longitudinal movement therewith, and extends laterally from adjacent the inner surface of left side wall 70. Side top plate 119 preferably includes a sealing edge 122 which extends downwardly and includes a wiper seal (e.g., 124) for maintaining a relatively tight seal between internal housing 100 and the inner surface of side wall 70 during longitudinal movement of internal housing 100 with second machine tool part 32.

As seen best in FIG. 5, disposed along the left lateral side edge of the front face of turret hood 103 is an expandable/collapsible portion 120, preferably including a bellows-like curtain. Particularly, bellows 120 are attached along the lateral side edge of turret hood 103 by a fixed plate 121. As indicated above, side top plate 119 is fixed relative to saddle 38 so that it moves only in a direction parallel to longitudinal axis L (and does not move in a transverse direction). Bellows section 120 is supported on a substantially transverse bellows rod 125 which permits relatively unencumbered expansion and collapse of the bellows in a lateral direction Parallel to transverse axis T, while maintaining a seal with fixed top plate 119. Similarly, the left edge of bellows 120 is sealingly attached to the sealing edge 122 oriented along the inner surface of left side wall 70, and thereby maintaining a seal therewith. As seen in the broken out portion of FIG. 5, sealing plate 122 preferably comprises a generally L-shaped plate to which wiper/seal 124 is bolted (e.g., via bolts 123) to the forward flange of the L-shape, while bellows 120 can be independently attached to the rearwardly extending flange of plate 122.

Figure 6:
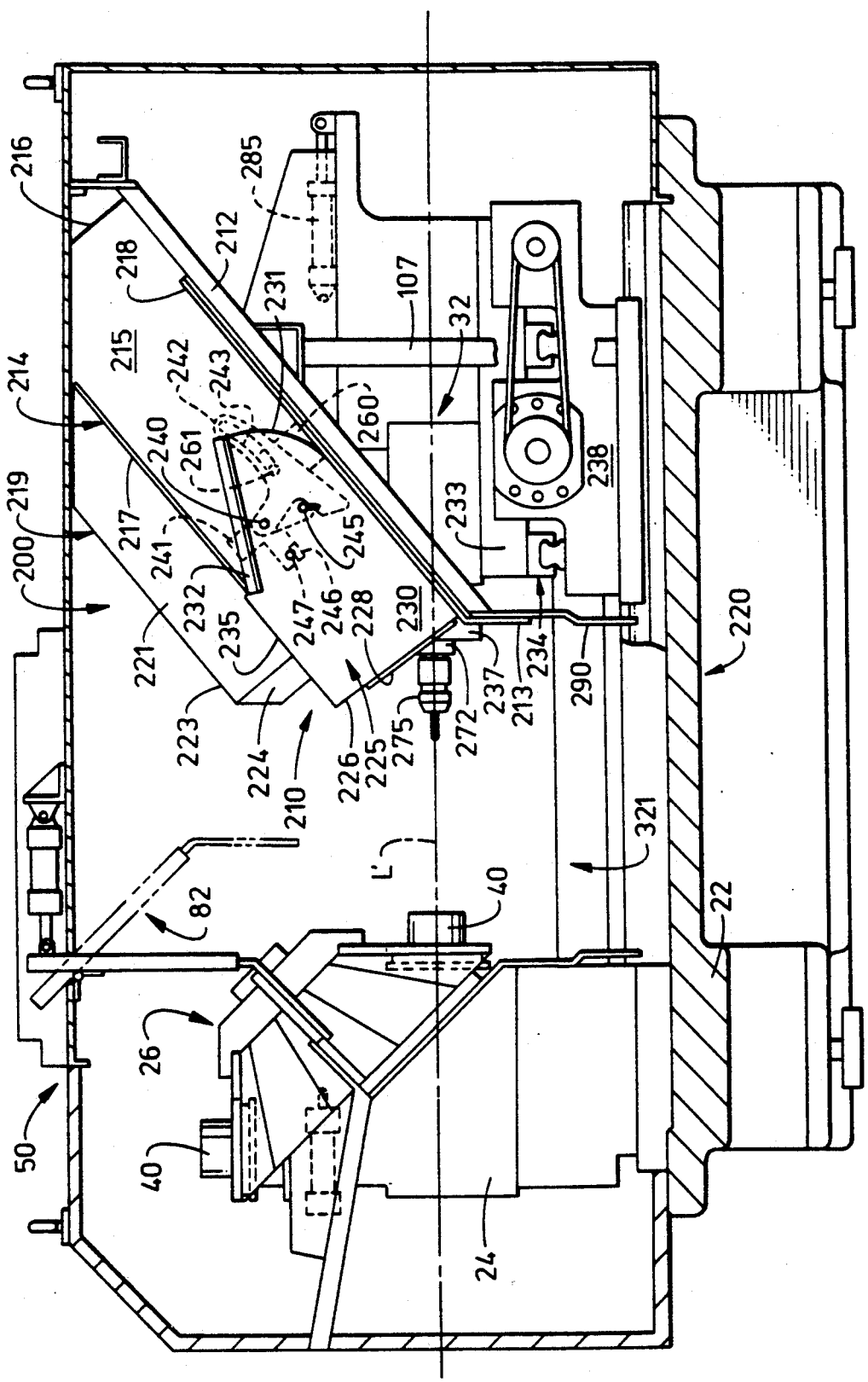
FIG. 6 is a partial, vertical cross-sectional view of an alternate embodiment of a cover assembly made in accordance with the present invention, illustrating a machine tool including a rotary tool changing mechanism and spindlehead assembly.

Another internal housing member 106 is immovably attached to saddle 38 (e.g., via one or more support arms 107 such as shown in FIG. 6) for a movement only along the longitudinal axis L of machine tool 20. Similar to fixed top plate 119, fixed housing member 106 includes an edge seal/wiper strip 108 for maintaining a seal with the inner surface of right side wall 61 as second machine tool part 32 is reciprocated along longitudinal axis L. In fact, it is preferred that fixed top plate 119 and fixed housing member 106 may be formed as an integral piece which comprises a substantial portion of turret hood 103. A downwardly depending wiper shield 111 provides a laterally moveable sealing interaction between turret hood side piece 113 and fixed internal housing member 106 as turret hood 103 and the second machine tool part 32 are reciprocated laterally along transverse axis T.

Side piece 113 is preferably connected directly to central top piece 117 and the front face turret hood 103 along flange 115. Consequently, it will be understood that the laterally moveable portion 112 of internal housing 100 comprises turret hood 103, central top piece 117, flange 115, side piece 113, and expandable/collapsible portion 120. Laterally moveable portion 112, in turn, surmounts the fixed internal housing member 106 and its associated side top plate 119, which are mounted for longitudinal movement only on saddle 38. Fixed top plate 119 may also include a downwardly extending wiper type seal 118 to interface with central top piece 117 in a manner similar to wiper shield 111 to provide dynamic seals between laterally moveable portion 112 and the portions of internal housing 100 which are fixed against lateral movement.

Below the upper edge of fixed internal housing member 106 and its associated fixed side top plate 119, is preferably arranged a gutter or drip shoulder 109 to prevent machine tool debris and coolant from working its way below internal housing 100 and second machine tool part 32. Similarly, adjacent the front portions of internal housing 100, a shield extension or seal 110 depends downwardly from fixed side piece 113 along the front portions of saddle 38 to effectively prevent coolant and machine debris from infiltrating beneath internal housing 100 to the working components of second machine tool part 32.

As illustrated in FIGS. 3-5, the machining or working area 21 of machine tool 20 is further provided with a longitudinally oriented debris collection apron 71 which extends inwardly from the inner surfaces of side walls 61 and 70, respectively, and angularly downwardly toward a debris collection channel or trough 74. A lower collection apron may also be provided to more closely conform with the base 22 of machine tool 20, as necessary. Debris collection channel 74 can be provided with a machine chip collection conveyor or other device for continuous collection and removal of debris from machining area 21.

It is also contemplated that a debris collection apron (e.g., 71) made in accordance with the present invention can be mounted to provide a predetermined amount of space (e.g., space S seen best in FIGS. 4, 5, and 7) between the collection apron and machine base 22 and other structural elements of a machine tool. Providing spaces S can allow for convective maintenance of heat from machine tool 20, such as by forcing air or other fluids through the predetermined space S to help maintain Proper working temperatures of machine tool 20. This can ensure more uniform thermal stability in operation of the machine.

Consequently, cover assembly 15 effectively isolates all working components of machine tool 20 from the work zone or machining area of machine tool 20, while safely enclosing the work zone (e.g., 21) and isolating it from the surrounding environment. Moreover, due to the parallel design and operation of the moveable or flexible portions of assembly 15 relative to the machine tool, there is no interference with the operations of machine tool 20, and no idle time is added to the machine cycles by assembly 15.

Figure 7:
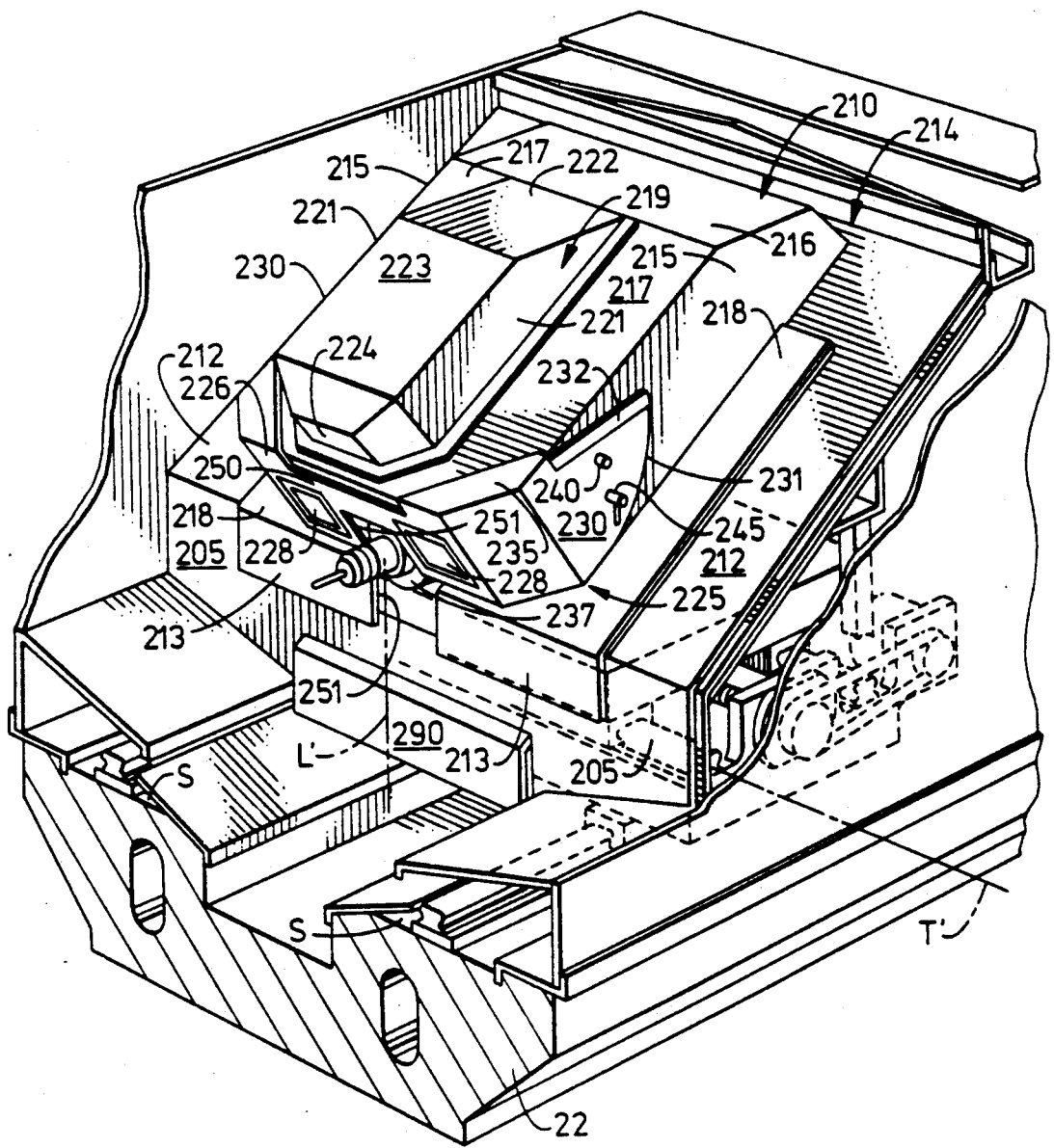
FIG. 7 is a partial perspective view of the internal housing portion of the cover assembly illustrated in FIG. 6.
Figure 8:
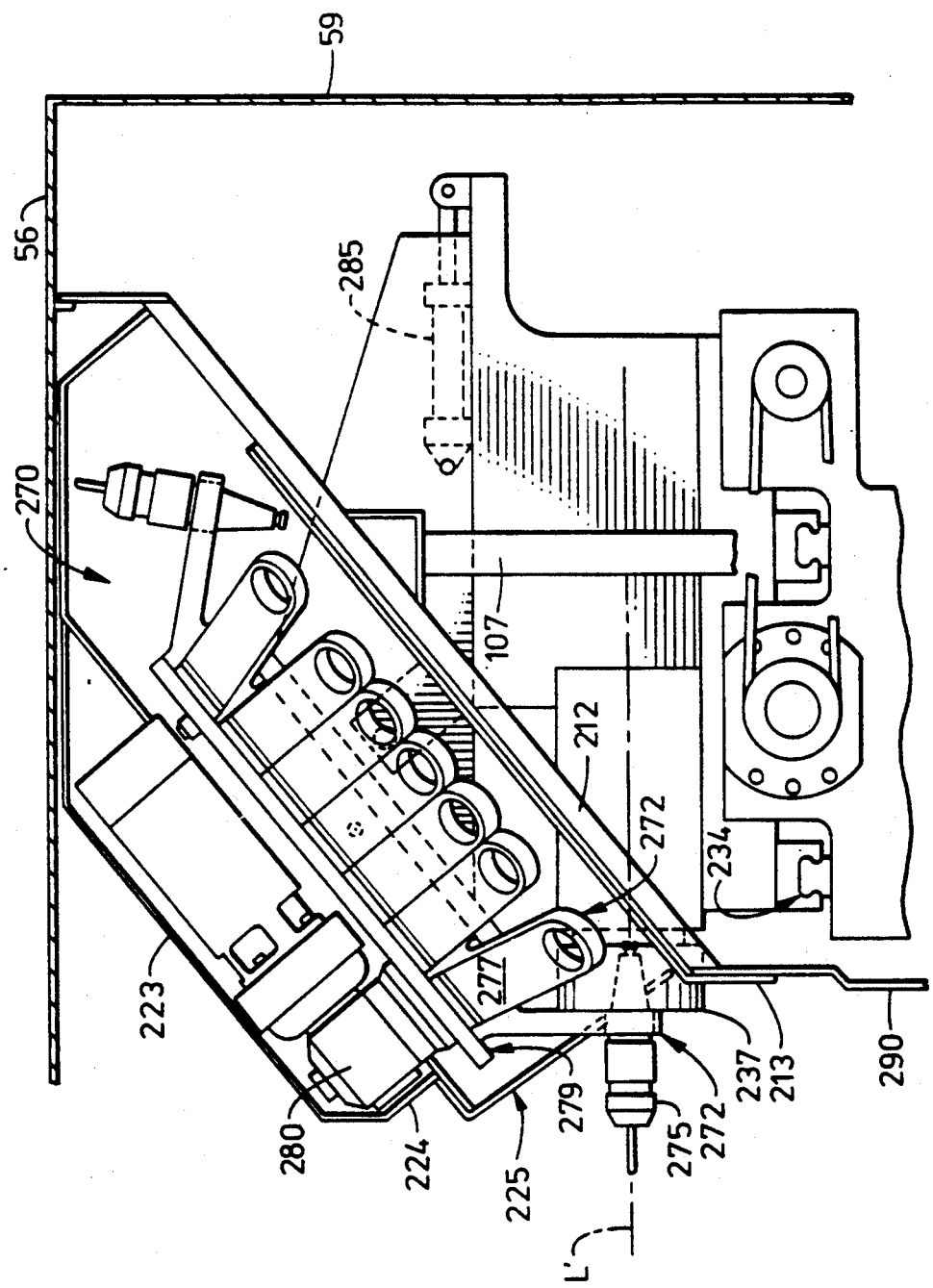
FIG. 8 is an enlarged, partial side elevational view of the internal housing of FIGS. 6 and 7.

FIGS. 6–8 illustrate an alternate embodiment of the present invention, wherein the machine tool configuration (e.g., 220) is directed to milling operations, and comprises a multiple tool changing device 270 surmounting a spindle/spindlehead 237. As generally indicated, it is contemplated that machine tool 220 would comprise a base 22, workhead 24, and workpiece changing mechanism 26, substantially the same as described above with regard to FIGS. 1–5. Cover assembly 150 is further illustrated as including an external housing 50 substantially identical to that described above, including the associated workpiece exchange shield 82.

However, because second machine tool part 32 of machine tool 220 comprises a rotary tool changer 270, and because the spindle 237 would most likely have a slightly different configuration (e.g., a centered spindle axis as opposed to the off-center axis generally used for turning operations) than the second machine tool part 32 described above, internal housing 200 features slightly different structure and operation to accommodate these differences. In fact, it is contemplated that cover assemblies made in accordance with the present invention will generally utilize an external housing substantially as described above, with slight variations in the internal housings required to accommodate specific applications. As seen in FIG. 6, it is contemplated that spindle 237 will be mounted on a laterally adjustable table 233, mounted upon transverse guide/guideway structure 234. Table 233, in turn, surmounts longitudinally adjustable saddle 238 to provide movement of the second machine tool part in a direction parallel to longitudinal axis L'.

It is contemplated that tool changer 270 might comprise a rotary arrangement including a plurality of tool carriers 272, each having a socket 274 for rotatably carrying a tool 275, and surmounting spindle 237. As best seen in FIG. 8, each tool carrier 272 includes a base 277 designed to be received for slidable movement along a guide channel 279, and a plurality of carrier bases 277 can be rotatably moved by an endless belt or chain situated adjacent guide channel 279. A tool changer motor 280 provides for rotary movement and indexing of tool carriers 272, and a reciprocating cylinder 285 provides longitudinal movement along axis L' of tool changer 270 relative to spindle 237. Such longitudinal reciprocation enables seating and unseating of tools relative spindlehead 237, and enables relatively unencumbered rotation of tool carriers 272 when reciprocated toward the front of the machine tool 20.

Internal housing 200 preferably comprises a box-like enclosure 210 mounted for lateral movement relative to transverse axis T' in conjunction with table 233 and spindlehead 237. Similar to the embodiment described above, internal housing 200 further comprises a portion which is stationary relative to transverse axis T', and relative to which box-like enclosure 210 is laterally moveable. Particularly, fixed plate 212 provides a relatively stationary cover for a substantial portion of spindlehead 237, and is attached to saddle 238 for movement only in a longitudinal direction along axis L'. As best seen in FIG. 6, fixed plate 212 is angularly oriented to direct coolant and machining debris downwardly toward the lower portions of machining area 321 for collection.

Box-like enclosure 210 is shown as comprising a lower enclosure 214 having oppositely disposed side walls 215, rear end 216 and top 217. Extending outwardly from the lower side portions of side walls 215 are flanges 218, which may preferably include downwardly extending wiper seals to maintain a dynamic seal with the upper surface of fixed plate 212. Front extension skirts 213 provide a covering extending down over the front portions of table 233 from flanges 218, in addition to downward face extensions 205 from plate 212. A smaller upper enclosure 219 surmounts lower enclosure 214, and comprises a front wall 224, oppositely disposed side walls 221, rear wall 222, and top wall 223. Upper enclosure 219 is designed to generally conform with and enclose tool changer motor 280 and its transmission and linkage structure.

Lower enclosure 214 is designed to generally conform with and substantially enclose rotary tool changer 270, and its exact shape and size will depend largely on the particular tool changing mechanism utilized. In the embodiment illustrated, enclosure 214 comprises a tool changer door 225 having a front wall 226, an upper surface 235, and oppositely disposed side walls 230 having curved lower edges 231 and a moveable wiper seal 232 adjacent its rearward portions. In some applications, it may be preferred to provide one or more windows (e.g., 228) or transparent portions in tool changer door 225 to facilitate visual access to tool changer 270. Tool changer door 225 is preferably hingedly mounted along a pivot axis 240 provided by bearing supports held within a pivot bracket 241 which extends outwardly from the tool changer frame.

Figure 9:
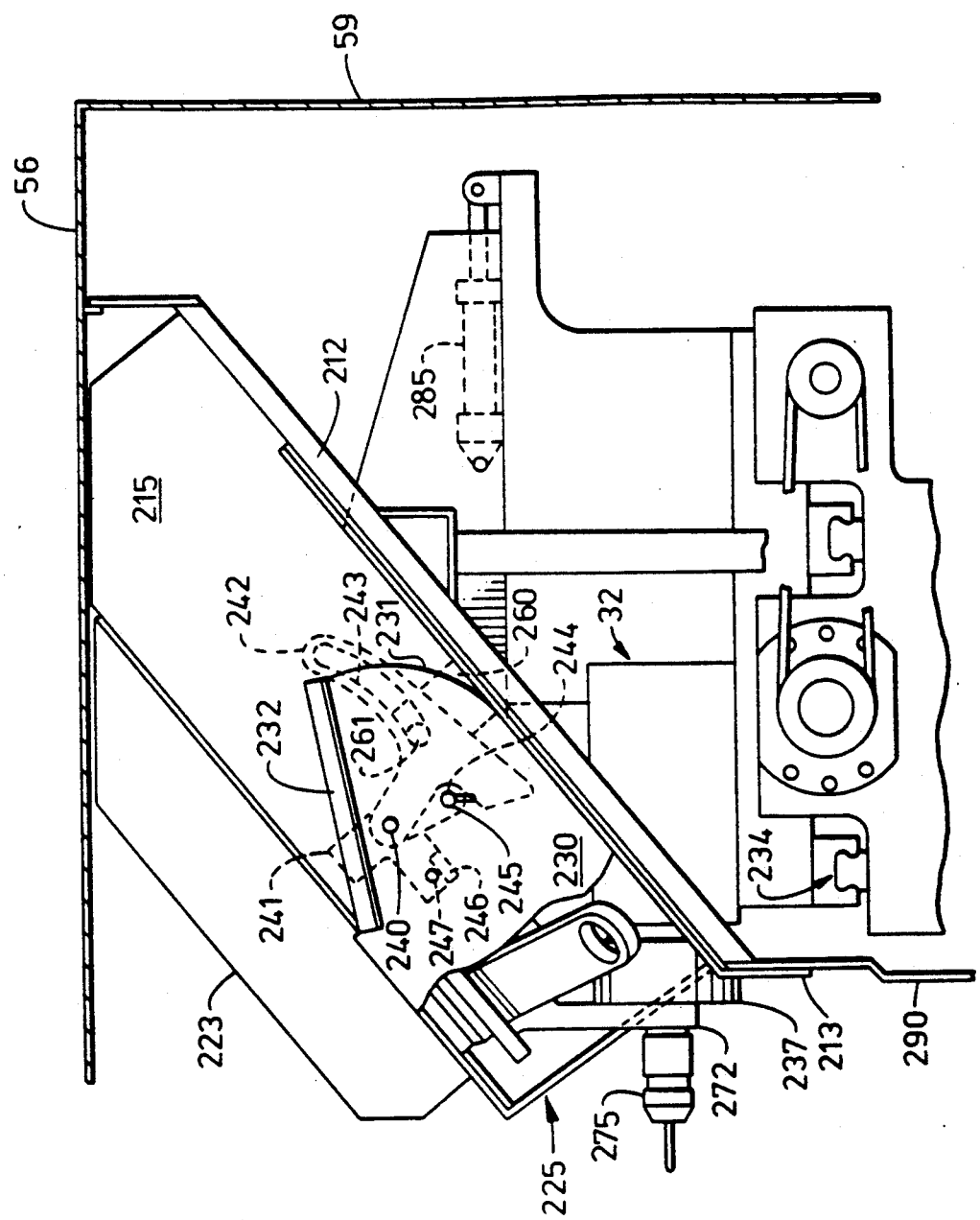
FIG. 9 is an enlarged, partial side elevational view similar to FIG. 8, and illustrating additional detail of the tool changer door reciprocation mechanism, as it would appear in a first, closed position.
Figure 10:
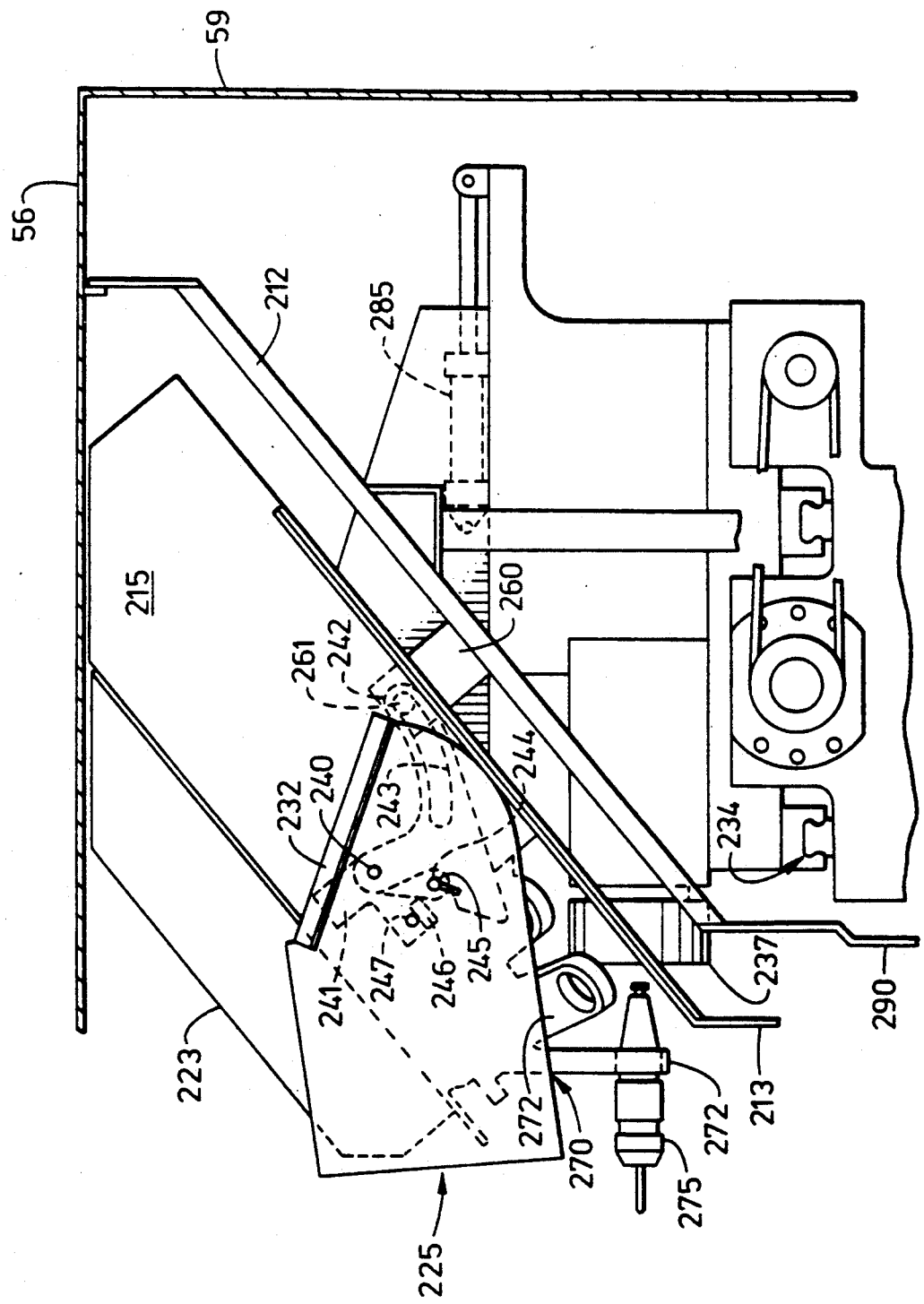
FIG. 10 is an enlarged, partial side elevational view similar to FIG. 9, illustrating the tool changer and changer door reciprocated into tool changing position.

As seen best in FIGS. 9 and 10, a pivot guide member 242 is attached to the inner surfaces of oppositely disposed side walls 230 and to pivot axis 240. Pivot guide 242 includes a crescent-shaped guide channel 243 into which is extended a guide roller 261 held within a stationary bracket 260 which may be mounted on fixed plate 212. A similar pivot guide/guide roller arrangement is provided on the opposite side of tool changer door 225 along pivot axis 240.

Turning now to FIGS. 8–10, when cylinder 285 reciprocates tool changer 270 toward the front of machine tool 220, guide channel 243 is moved in a longitudinal direction, whereby guide roller 261 causes tool changer door 225 to hingedly reciprocate in an upward direction as a result of the crescent-shape of guide channel 243. This interaction causes tool changer door 225 to be moved from its first, closed position (as seen in FIGS. 8 and 9) to a tool changing or open position (as seen in FIG. 10). In open condition, tool changer door 225 allows rotary motion of tool changer tool 270 without interference from enclosure 210. Consequently, longitudinal movement of tool changer 270 enables a tool (e.g., 275) to be disengaged and withdrawn from spindlehead 237 and automatic (and substantially simultaneous) opening of tool changer door 225, then tool changer 270 can be rotated to align a different tool with spindlehead 237; while rearward longitudinal reciprocation can thereafter seat the new tool in the spindlehead for engagement and use, while simultaneously closing door 225. As can be seen, internal housing 200 is thereby designed to operate in a manner closely paralleling the respective movements of machine tool 220 without interference and without adding to the non-machining or idle time thereof.

A lock pin 245 is normally seated within lock aperture 244 to tie connect changer door 225 directly to pivot guide 242. There may be times, however, when manual release and opening of door 225 is desired for inspection, maintenance, or the like. In such cases, lock pin 245 can be released and withdrawn from aperture 244, and door 225 can be manually opened in an upward rotational direction. A ramp 246 and detent hole 247 are provided in a portion of pivot bracket 241 to allow insertion and retention of lock pin 245 in the manually-opened position. The lock pin need merely be released from detent hole 247 and locked back into aperture 244 to resume automatic operation.

As best seen in FIG. 7, tool changer door 225 preferably includes a tool apron or front face 250 having an opening 251 designed to accommodate at least a portion of spindle 237 and a tool 275 supported by a tool carrier 272.

As described above, external housing 50 would include machine part access panels (e.g., 67) and machining area access portals (e.g., 63) to provide convenient visual and/or physical access to machine tool parts. It is further contemplated that top wall 56 would also include one or more removable access panels (e.g., 56a shown in FIG. 1) to facilitate maintenance of the second machine tool part (e.g., 32 and 232), and to enable exchange of internal housing structure in order to accommodate reconfiguration of a machine tool utilizing the cover assembly of the present invention.

To further accommodate possible reconfiguration of a machine tool, and/or major machine tool maintenance or repair, external housing 50 may also be removable as a single integral unit. Particularly, it is contemplated that by disconnection of external housing 50 from base 22 along retainer ridge 23, and any other points of direct connection with machine tool 20, an integral external housing 50 can be removed such as via a plurality of lifting fixtures 17 which may be conveniently provided that reinforced lifting points.

Having shown and described the preferred embodiments of the present invention, further adaptions of the cover assembly described herein can be accomplished by appropriate modifications by one of ordinary skill in the art without departing from the scope of the present invention. Several of these potential modifications have been mentioned, and others will become apparent to those skilled in the art. For example, tool changer door 225 could similarly be automatically opened and closed in parallel operation with tool changer 270 via a synchronized cylinder drive (e.g., hydraulic) as an alternative to the mechanical arrangement illustrated in FIGS. 6-10. Accordingly, the scope of the present invention should be considered in terms of the following claims and is understood not to be limited to the details of structure and operation shown and described in the specification and drawings.

I claim:

1. A cover assembly for a machine tool having a workhead and a workpiece changing mechanism with a pair of spaced apart workpiece transfer stations for alternately rotating workpieces between the workhead and a workpiece loading/unloading zone, said cover assembly comprising a housing substantially enclosing said machine tool and having a workpiece exchange opening, and a workpiece exchange shield attached to said housing adjacent said opening, said opening providing sufficient clearance for rotation of said workpiece changing mechanism, said shield having means for sealingly engaging said workpiece changing mechanism when in sealing position to substantially close said opening, and means for reciprocating said shield away from said changing mechanism to an exchange position which accommodates the rotation of said changing mechanism without interference.

2. The cover assembly of claim 1, wherein said workpiece changing mechanism comprises a substantially conical skirt about which a plurality of workpiece transfer stations are spaced, and an upstanding splash panel extending across said skirt between a pair of oppositely disposed transfer stations, and wherein said workpiece exchange shield comprises a semi-circular cutout for sealingly interfacing with said skirt and its splash panel when in sealing position.

3. The cover assembly of claim 2, wherein said workpiece exchange shield overlaps a portion of said splash panel when in said sealing position to effectively retain machining debris and fluid within said housing.

4. The cover assembly of claim 2, wherein said splash panel comprises oppositely disposed faces which are alternately oriented inwardly toward the enclosed machine tool, and wherein said workpiece exchange shield is reciprocated toward and away from the splash panel face oriented inwardly.

5. The cover assembly of claim 1, wherein said workpiece exchange shield is hingedly connected to the housing and is reciprocable about said hinge between said sealing and exchange positions.

6. The cover assembly of claim 1, wherein said machine tool has a base with longitudinal and transverse axes, and a second machine tool part is supported on said base for movement relative to said axes and a workpiece supported on said workhead, and wherein said cover assembly further comprises an internal housing substantially enclosing said second machine part and mounted within said housing, at least a portion of said internal housing attached for movement with said second machine part.

7. The cover assembly of claim 1, wherein said workpiece changing mechanism is reciprocable relative to said workhead to facilitate engagement and disengagement of a workpiece, and wherein said shield is reciprocated in parallel with reciprocation of said workpiece changing mechanism to accommodate said rotation without adding to machine idle time.

8. The cover assembly of claim 6, wherein said internal housing further comprises a box-like enclosure having a tool changer door with a cutout for accommodating a tool associated with said second machine part when in sealed position, said door being pivotable to a tool exchange position when tool changing procedures are implemented.

9. The cover assembly of claim 1, wherein said exchange shield is non-planar and includes a first panel member hingedly connected to said housing for articulation therewith, and a second panel member attached to said first panel member and oriented at an angle thereto.

10. A cover assembly for a machine tool having a base with longitudinal and transverse axes, a workhead mounted on the base for supporting a workpiece, a rotatable workpiece changing mechanism for alternately locating workpieces adjacent said workhead and a remote workpiece loading/unloading zone, and a second machine part supported on said base for movement relative to said longitudinal and transverse axes and a workpiece for machining operations, said cover assembly comprising:
- an external housing member substantially enclosing said workhead and said second machine part and permitting movement of said second machine part therewithin, said external housing member further comprising a workpiece exchange opening and a reciprocable workpiece exchange shield attached thereto having a first sealing position wherein said reciprocable shield interfaces with said rotatable workpiece changing mechanism to substantially close said opening, and a workpiece exchange position which accommodates rotation of said changing mechanism; and
- an internal housing substantially enclosing said second machine part and mounted within said external housing member, at least a portion of said internal housing attached for movement with said second machine part.

11. The cover assembly of claim 10, wherein said workpiece changing mechanism is reciprocable relative to said workhead to facilitate engagement and disengagement of a workpiece, and wherein said workpiece exchange shield is reciprocated in parallel with said workpiece changing mechanism.

12. The cover assembly of claim 10, wherein said workpiece changing mechanism comprises a substantially conical skirt about which a plurality of workpiece transfer stations are spaced, and an upstanding splash panel extending across said skirt between a pair of oppositely disposed transfer stations, and wherein said reciprocable workpiece exchange shield comprises means for sealingly interfacing with said skirt and its splash panel when in sealing position.

13. The cover assembly of claim 10, wherein said internal housing comprises an expandable and collapsible portion fastened adjacent an internal wall of said external housing, whereby movement of said second machine part is accommodated while maintaining an effective enclosure within said external housing.

14. The cover assembly of claim 10, wherein said internal housing further comprises a box-like enclosure having a pivotable tool changer door with a cutout for accommodating a tool held within said second machine part when in a machining position.

15. The cover assembly of claim 10, wherein said reciprocable workpiece exchange shield is hingedly connected to the external housing for articulation between said sealing and exchange positions.

16. A cover assembly for a machine tool having a base with longitudinal and transverse axes, a workhead mounted on the base for supporting a workpiece, a rotatable workpiece changing mechanism surmounting said workhead, and a second machine part supported on said base for movement relative said longitudinal and transverse axes and a workpiece on said workhead for machining operations, said cover assembly comprising:
- an external housing member substantially enclosing said workhead and said second machine part and permitting movement of said second machine part therewithin, said external housing member further comprising a workpiece exchange opening and a reciprocable workpiece exchange shield attached adjacent thereto, said exchange shield having a sealing position in which it interfaces with said rotatable workpiece changing mechanism to substantially close said opening, and an exchange position which accommodates rotation of said changing mechanism; and
- an internal housing substantially enclosing said second machine part and mounted for movement with said second machine part within said external housing.

17. The cover assembly of claim 16, wherein said workpiece changing mechanism comprises a substantially conical skirt about which a plurality of workpiece transfer stations are provided, and an upstanding splash panel extending across said skirt between a pair of oppositely disposed transfer stations, and wherein said reciprocable workpiece exchange shield comprises a semicircular cutout for sealingly interfacing with said skirt and its splash panel when in sealing position.

18. The cover assembly of claim 17, wherein said reciprocable shield overlaps a portion of said splash panel when in said sealing position to effectively retain machining debris and fluid within said housing.

19. The cover assembly of claim 16, wherein said workpiece changing mechanism is reciprocable relative to said workhead to facilitate engagement and disengagement of a workpiece, and wherein said shield is reciprocated in parallel with said workpiece changing mechanism to accommodate said rotation without adding to machine idle time.

20. The cover assembly of claim 16, wherein said internal shield member further comprises a box-like enclosure having a tool changer door with a cutout for accommodating a tool associated with said second machine part when in a machining position, said door being pivotable to a tool exchange position when tool changing procedures are implemented.

* * * * *